US012744056B2

(12) United States Patent
Mendonsa et al.

(10) Patent No.: US 12,744,056 B2
(45) Date of Patent: Sep. 22, 2026

(54) PIEZOELECTRIC MOTOR FOR HARD DISK DRIVE ACTUATOR ARM

(71) Applicant: Seagate Technology LLC, Fremont, CA (US)

(72) Inventors: Riyan Alex Mendonsa, Edina, MN (US); Brett Robert Herdendorf, Mound, MN (US); Xiong Liu, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 19/061,586

(22) Filed: Feb. 24, 2025

(65) Prior Publication Data

US 2026/0253609 A1 Aug. 27, 2026

(51) Int. Cl.
*G11B 5/48* (2006.01)
*G11B 5/55* (2006.01)

(52) U.S. Cl.
CPC .................................. *G11B 5/4873* (2013.01)

(58) Field of Classification Search
CPC ......... G11B 5/4826; G11B 21/22; G11B 5/56; G11B 5/5578; G11B 5/48; G11B 21/12; G11B 21/24; G11B 5/54; G11B 21/16; G11B 5/4813; G11B 5/4833; G11B 5/4886; G11B 5/5521; G11B 5/5573
USPC ....................................................... 360/266.1
See application file for complete search history.

(56) References Cited

U.S. PATENT DOCUMENTS

| | | | | |
|---|---|---|---|---|
| 6,975,481 | B1 | 12/2005 | Oswald et al. | |
| 9,361,919 | B1 | 6/2016 | Lieu et al. | |
| 10,930,307 | B2 | 2/2021 | Sukla et al. | |
| 11,043,235 | B2 | 6/2021 | Mendonsa et al. | |
| 11,315,592 | B1 | 4/2022 | Carper et al. | |
| 11,348,611 | B1 * | 5/2022 | Mendonsa | G11B 21/22 |
| 11,361,787 | B1 * | 6/2022 | Mendonsa | G11B 5/5578 |
| 11,443,763 | B1 | 9/2022 | Ma et al. | |
| 11,468,909 | B1 * | 10/2022 | Liang | G11B 5/4826 |
| 11,716,963 | B2 | 8/2023 | McDougal et al. | |
| 11,948,612 | B2 * | 4/2024 | Mendonsa | G11B 5/56 |

OTHER PUBLICATIONS

Spanner et al., "Piezoelectric Motors, an Overview" Feb. 26, 2016, *Actuators*, 5(1):6.

Zhang et al., "A stick-slip/inchworm hybrid rotary piezo motor based on a symmetric triangular driving mechanism" Sep. 26, 2019, *Appl. Phys. Lett.*, 115:131904.

* cited by examiner

*Primary Examiner* — Nabil Z Hindi
(74) *Attorney, Agent, or Firm* — Mueting Raasch Group

(57) ABSTRACT

Described are hard drive devise in which piezoelectric motors are used to drive the motion of actuator arms, rather than the actuator arms being controlled by electromagnetic means such as a conventional voice coil motor. Piezo-based motors suitable for use with devices of the present disclosure may include inchworm motors, brake crawler motors, ultrasonic motors (USMs), and so forth. Such piezo motors may be used to drive rotary actuator motion or linear actuator motion. Moreover, piezo motors can be provided in a compact form factor that allows the actuator arms of a stack of actuator arms to be separately controlled, either as groups or individually.

11 Claims, 5 Drawing Sheets

PIEZOELECTRIC MOTOR FOR HARD DISK DRIVE ACTUATOR ARM

The disclosure relates to systems and methods for positioning of hard disk drive actuator arms using piezoelectric motors.

SUMMARY

In accordance with certain aspects, the present disclosure describes hard disk drives for using a recording head to store data on a rotating magnetic media disk, the hard disk drives including an actuator assembly configured to suspend the recording head over a surface of the rotating magnetic media disk, the actuator assembly rotatably coupled to a stationary pivot, and also including a piezo motor configured to rotate the actuator assembly around the pivot. The piezo motor may be composed of any suitable piezoelectric device. In certain aspects, the actuator assembly rotation is controlled only by the piezo motor.

In certain aspects, the piezo motor engages a slider stage attached to the actuator assembly to thereby rotate the actuator assembly.

In certain aspects, the hard drives may include a second actuator assembly configured to suspend a second recording head over the same surface of the rotating magnetic media disk, the second actuator assembly rotatably coupled to a second stationary pivot, and a second piezo motor configured to independently rotate the second actuator assembly around the second pivot.

In accordance with certain aspects, the present disclosure describes hard disk drives for using a plurality of recording heads to store data on recording surfaces of a plurality of rotating magnetic media disks, such hard disk drive including a plurality of actuator assemblies, each of the actuator assemblies configured to suspend one or more of the plurality of recording heads over corresponding one or more recording surfaces of the plurality of rotating magnetic media disks, the plurality of actuator assemblies being independently rotatable around a single stationary pivot, and a plurality of piezo motors, each of the plurality of piezo motors associated with a different one of the plurality of actuator assemblies and configured to rotate the associated actuator assembly around the pivot.

In certain aspects, the piezo motors are arranged in a vertically aligned stack. In certain aspects, the piezo motors are arranged into a first vertically aligned stack that includes a first portion of the piezo motors, the first vertically aligned stack positioned at a first location around the pivot, and a second vertically aligned stack that includes a second portion of the piezo motors, the second vertically aligned stack positioned at a second location around the pivot separated from the first location. In certain aspects, the first portion of the piezo motors is vertically staggered relative to the second portion of the piezo motors.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
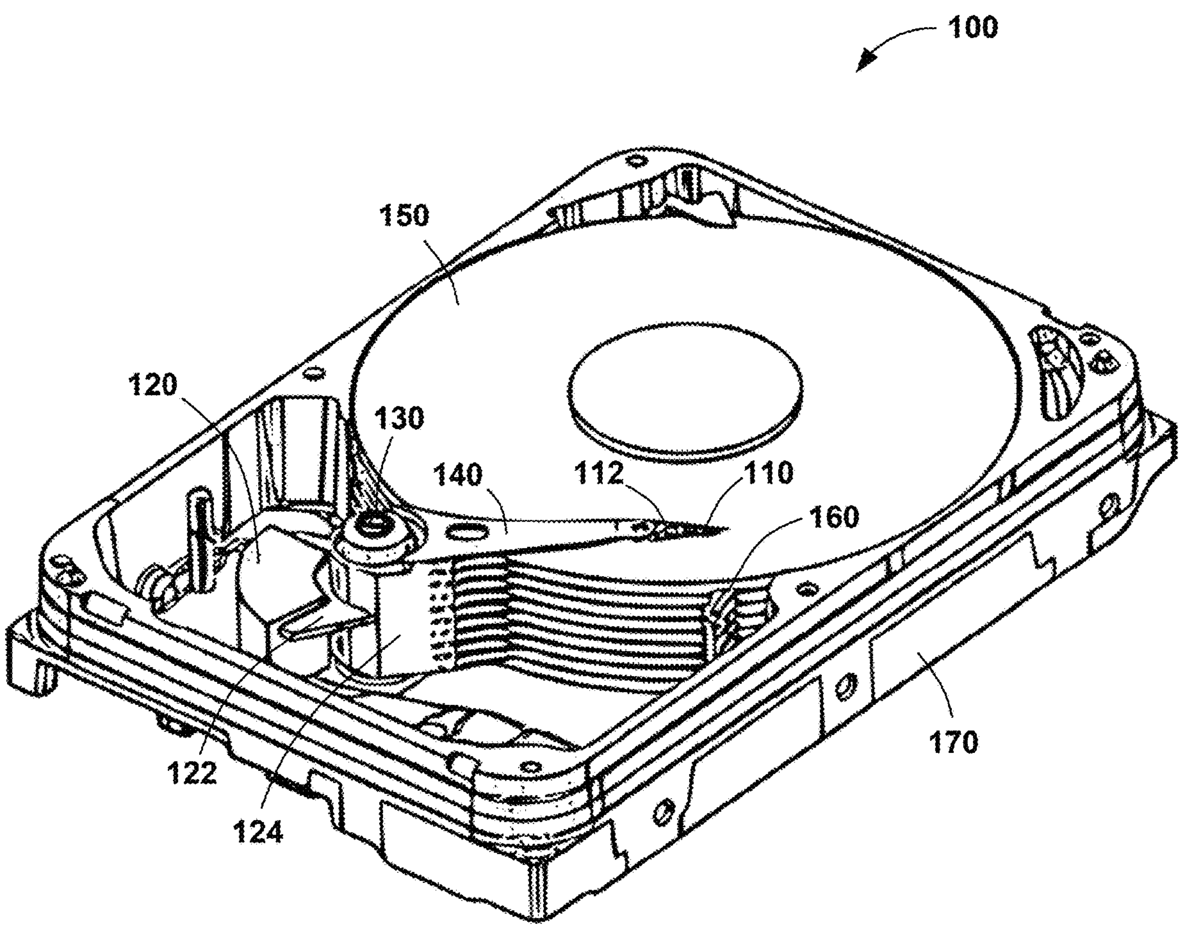
FIG. 1 is a schematic depiction of a hard drive device that includes a piezo motor for controlling rotary motion of a stack of actuators in accordance with aspects of the present disclosure.

The present disclosure relates to the use of piezoelectric motors to drive the motion of actuator arms in hard disk drives (HDDs), rather than the actuator arms being controlled by electromagnetic means such as a conventional voice coil motor (VCM). Piezo-based motors suitable for use with devices of the present disclosure may include inchworm motors, brake crawler motors, ultrasonic motors (USMs), and so forth. Preferably, the piezo motors are capable of providing both coarse and fine motion with a high degree of accuracy and minimal settle time. In various embodiments, piezo motors may be used to drive rotary actuator motion or linear actuator motion. Moreover, piezo motors can be provided in a compact form factor that allows the actuator arms of a stack of actuator arms to be separately controlled, either as groups or individually.

As HDD storage capacity continues to increase, the increase in data throughput and IOPS (input/output operations per second) has not kept pace, leading to the potential for slow data retrieval. One step toward alleviating this issue is to design multi-actuator drives in which multiple heads are active at the same time. However, such designs have required space for additional VCM actuator leads and other components, and/or have required a reduction in the number of media disks to accommodate the additional motor components. In accordance with various aspects, the present disclosure provides for piezoelectric motor actuation of the actuator arm(s) in an HDD. Piezoelectric motor actuation of the actuator arm(s) can allow for compact and low-clearance designs that provide the ability to individually and separately control the movement of each actuator arm in a stack, thereby saving space and maintaining the number of disks. For example, rotary piezo actuators can be stacked along and/or staggered around the pivot point of a stack of actuators to thereby achieve multiple actuator actuation without loss of disk space.

Piezoelectric motors have a number of potential advantages over conventional electromagnetic motors. Piezo motors are generally small and compact for their power output, and provide greater force and torque relative to their dimensions. In addition, piezo motors have high holding torque maintained at zero input power, and they offer low inertia from their rotors, providing rapid start and stop characteristics. Additionally, piezo motors are unaffected by electromagnetic fields, which can hamper other motor types. Piezo motors typically do not produce magnetic fields and also are not affected by external magnetic fields. Because they operate at ultrasonic frequencies, these motors do not produce sound during operation.

Reference will now be made to the drawings, which depict one or more aspects described in this disclosure. However, it will be understood that other aspects not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar. It will also be appreciated that the drawings are meant to illustrate certain aspects and arrangements of features in a way that contributes to their understanding and are not meant to be scale drawings that accurately represent size or shape of elements.

FIG. 1 schematically shows various internal components contained in the housing 170 of an example HDD 100 that utilizes a recording head 110 to write and read data to and from a magnetic recording media disks 150. The position of the recording head 110 across the spinning media disk 150 is determined by the movement of an actuator arm 140 to which the recording head 110 is connected via a suspension 112. The actuator arm 140 is moved around a pivot 130. In a conventional HDD, the motion of the actuator arm 140 around the pivot 130 is controlled by an electromagnetic motor such as a VCM (not shown), which can be quite bulky, take up a fair amount of space within the HDD housing 170, and require the use of rare earth magnets. In accordance with various aspects of the present disclosure, a piezo motor 120 may be used to control the rotary motion of the actuator 140 around pivot 130.

In the HDD 100 shown in FIG. 1, actuator 140 is one actuator in an actuator stack 124 that moves as a single unit such that all the actuator arms in the stack 124 move together. In one embodiment, piezo motor 120 can function by acting on a slider stage 122 that is attached to the hub of the actuator stack 124. In this case, piezo motor 120 acts to "push" or "pull" the slider stage 122 back and forth in the plane of the slider stage 122, that is horizontally. This will affect a rotary motion of the actuators around pivot 130, which is a stationary point relative to the housing 170 and located to the side of the media disks 150. When the HDD 100 is idle and the actuators are not in motion, they may be parked on ramps 160. In other embodiments, the actuator stack 124 may be mounted to a linear rail system (not shown) rather than the rotary pivot 130, so that the motion of the actuators, and therefore the recording heads, across the media disks follows a straight line rather than an arc. The piezo motor 120 can be a piezo motor that operates on any piezo driving principle, which may be generally classified as resonant motors such as USMs and non-resonant motors such as inchworm motors, stepper motors, slip-stick motors, and so forth.

Figure 2:
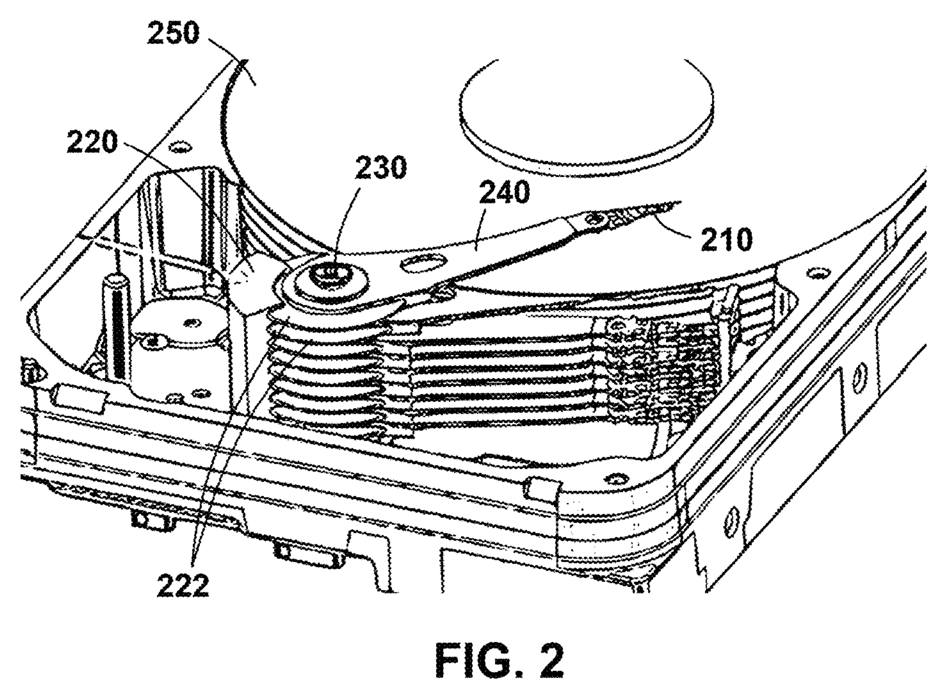
FIG. 2 is a schematic depiction of a hard drive device that includes piezo motor control of actuator rotary motion in accordance with aspects of the present disclosure.

FIG. 2 schematically shows a portion of an example HDD that utilizes a recording head 210 to write and read data to and from a magnetic recording media disk 250. Actuators 240 are provided in a stack of actuators that are each separately rotatable around a stationary pivot 230. Each actuator 240 is associated with a slider stage 222 that is engaged by a piezo motor in a stack of piezo motors 220. As such, the movement of each actuator arm may be separately controlled. This allows for multiple recording heads to be simultaneously active and engaged with their respective media surfaces, thus greatly increasing the potential data throughput.

Figure 3:
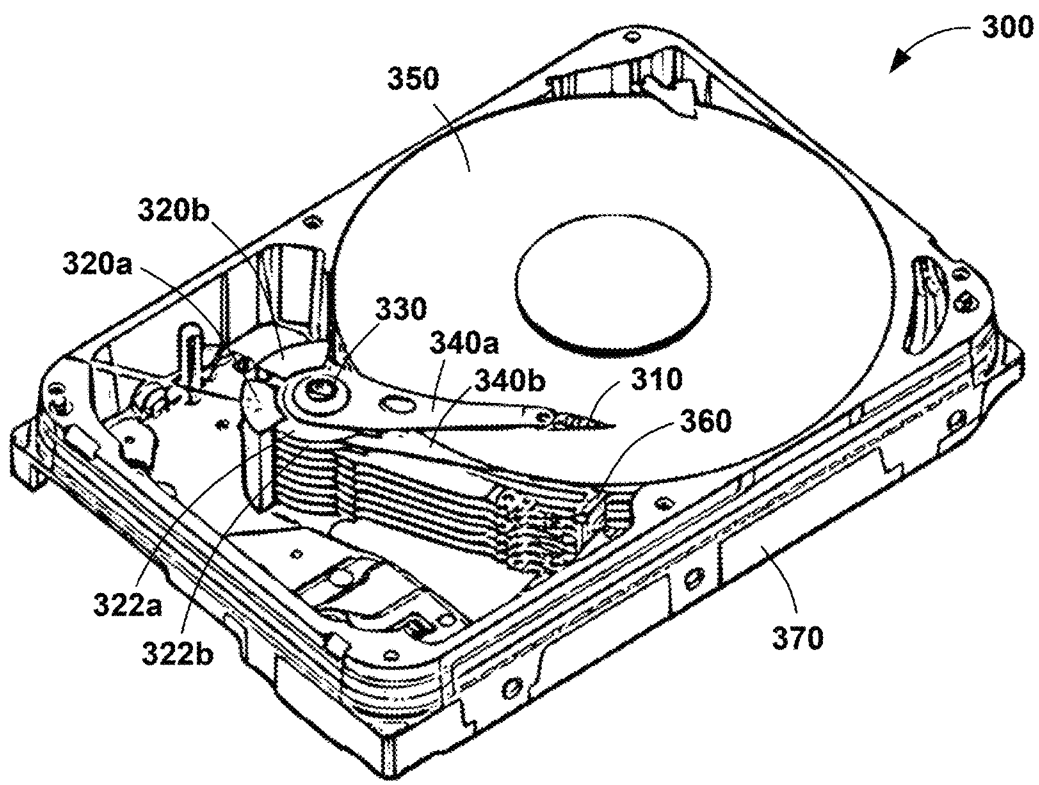
FIG. 3 is a schematic depiction of a hard drive device that includes piezo motor control of actuator rotary motion in accordance with aspects of the present disclosure.

FIG. 3 schematically shows various internal components contained in the housing 370 of an example HDD 300 that utilizes a recording head 310 to write and read data to and from a magnetic recording media disk 350. In this case, the piezo motors are divided into two piezo motor stacks **320*a* and 320*b*. The motors of piezo motor stacks 320*a* and 320*b* are vertically staggered relative to one another, for example so that the top actuator 340*a* of the stack of actuators is controlled by a piezo motor from motor stack 320*a*, the next lower actuator 340*b* of the stack of actuators is controlled by a piezo motor from motor stack 320*b*, and so on in alternating fashion. This staggered arrangement of motors into two stacks allows for additional room vertically in the stack for the individual piezo motors to be accommodated. All of the actuators 340*a*, 340*b*, and so forth are separately rotatable around pivot 330, which is stationary relative to the housing 370. Each actuator is associated with a slider stage that is engaged by one of the piezo motors, for example actuator 340*a* is associated with slider stage 322*a*, which is engaged by a piezo motor from motor stack 320*a*, and actuator 340*b* is associated with slider stage 322*b*, which is engaged by a piezo motor from motor stack 320*b*. Each recording head can be individually parked on ramp 360**.

For the configurations shown in FIG. 2 and FIG. 3, one or more of the following features may be considered. It may be desirable to include damping materials between actuators to help ensure that movements, motor operations, vibrations, and so forth, in one do not affect others. The number of actuator arms may be reduced by including an elevator-style system for vertically moving actuator arms, such as disclosed in U.S. Pat. No. 11,348,611. The signals from the multiple active recording heads may be routed to individual preamps, or a larger preamp may be used to handle the signal from multiple (or all) recording heads. While FIGS. 2 and 3 show a slider stage (or plate) engagement to move the rotor, which may provide stabilization to the suspension arm and provide a larger contact surface for the motor, other configurations may be used. For example, the surface of the bearing may be activated, such as shown in reference to FIGS. 4A and 4B. Moreover, it may be possible to use the piezo motor grip to help in correcting for yaw and z-height, as well as adjust for tolerancing. Conversely, if the media and head alignment is fixed, then some form of compliance may be applied, such as a floating stack. To adjust for tolerancing calibration of the actuation components of the ultrasonic motor, it may be necessary to have asymmetric loading.

Figure 4A:
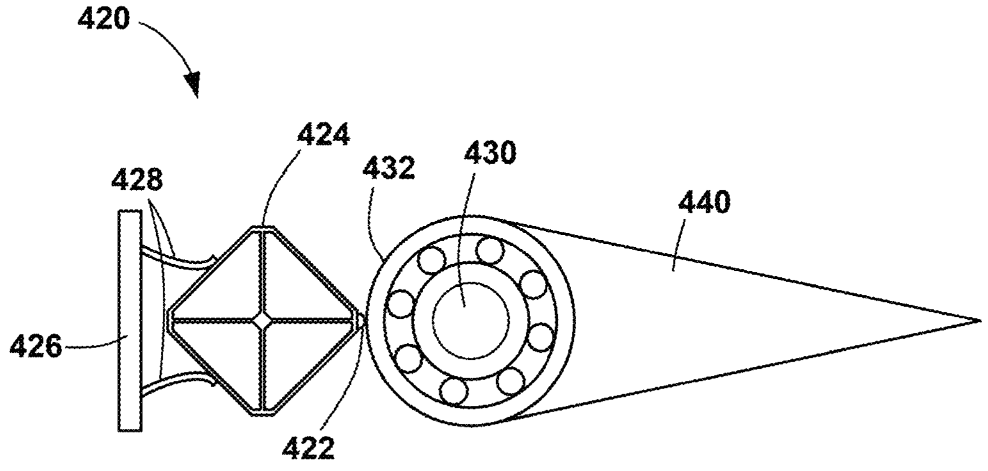
FIG. 4A is a schematic top view of an embodiment of ultrasonic motor driving the rotary motion of an actuator in accordance with aspects of the present disclosure.
Figure 4B:
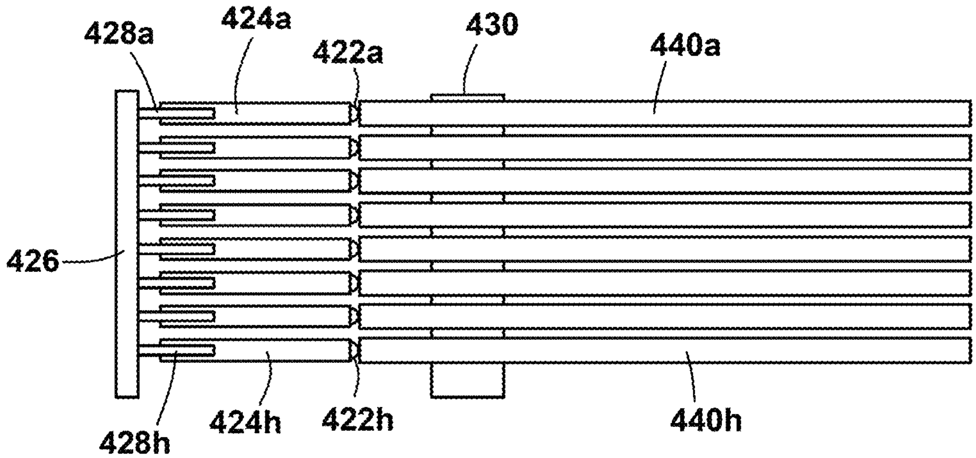
FIG. 4B is a schematic side view of an embodiment of ultrasonic motors driving the rotary motion of actuators in accordance with aspects of the present disclosure.

FIGS. 4A and 4B schematically show top and side views, respectively, of ultrasonic motors 420 configured to engage the bearing surface 432 for rotating actuator 440 around stationary pivot 430. Ultrasonic motor 420 includes a piezoelectric device 424 capable of operating in an ultrasonic mode, a stator tip 422 for engaging bearing surface 432 and imparting motion based on the activation of piezoelectric device 424, and preload springs 428 mounted between support 426 and piezoelectric device 424. The preload spring system 428 provides a constant force to the ultrasonic motor 420. FIG. 4B indicates that multiple separate piezo devices **424*a*-424*h*, preload systems 428*a*-428*h*, and stators 422*a*-422*h* may be used to drive the rotational movement of multiple separate actuator arms 440*a*-440*h* around a single stationary pivot 430. This configuration provides a compact design. Support 426** may be a monolithic or segmented support structure that is fixed to the base of an HDD housing, and may include various components or layers that provide damping for vibrationally isolating individual motors.

In general, ultrasonic piezoelectric motors function by using a piezoelectric element to produce ultrasonic vibrations of an appropriate type in a stator structure. The elliptical movements of the stator are converted into the movement of a slider stage (or bearing surface) that is pressed into frictional contact with the stator. The consequent movement may either be rotational or linear depending on the design of the structure. Linear piezoelectric motors typically offer one degree of freedom, such as in linear stages, but they can be combined to provide more complex positioning factors. As indicated in FIGS. 1-3, as well as in FIGS. 4A-4B, piezo devices that provide for linear back-and-forth force (torque) can be configured to impart rotational motion around a pivot. Rotating piezoelectric motors that use piezo devices to move a stage in a rotary fashion, are commonly used in sub-micrometer positioning devices. Large mechanical torque can be achieved by combining multiple rotational units.

Figure 5A:
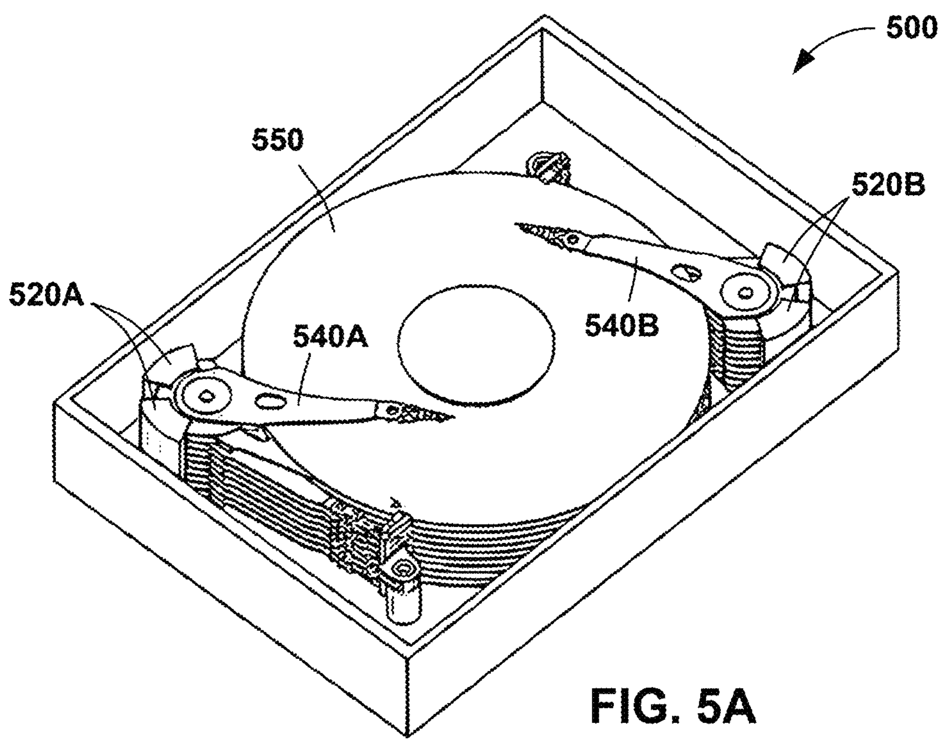
FIG. 5A is a schematic depiction of a hard drive device that includes multiple actuator stacks, each having piezo motor control of actuator rotary motion in accordance with aspects of the present disclosure.
Figure 5B:
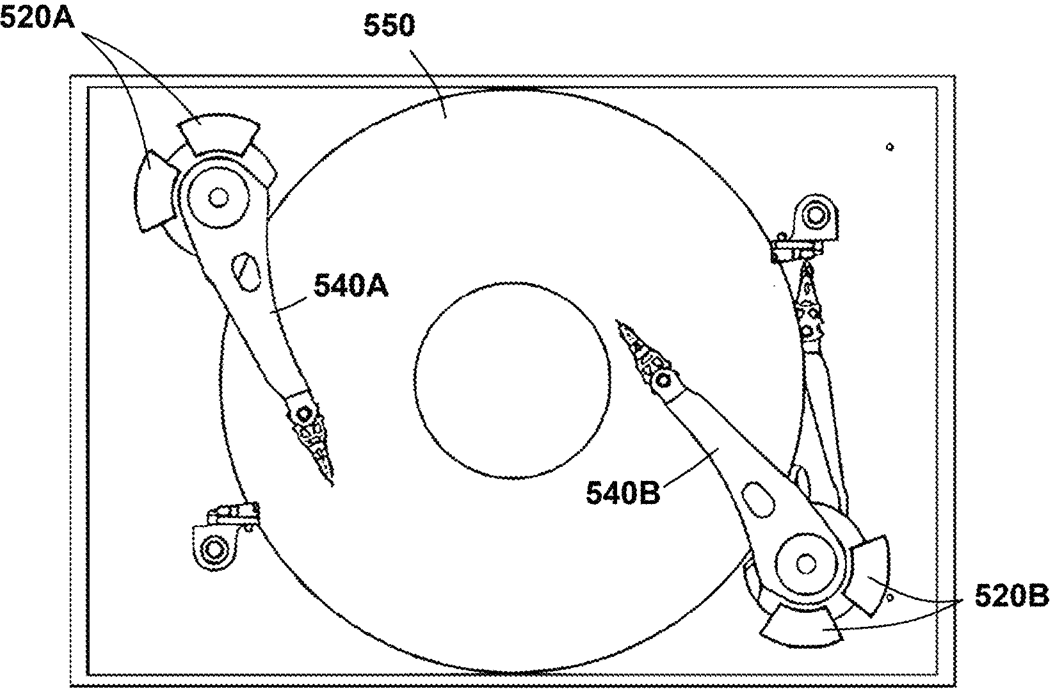
FIG. 5B is a schematic top view of the hard drive device shown in FIG. 5B.

FIGS. 5A and 5B schematically show a perspective view and a top view, respectively, of a two heads per surface configuration. HDD 500 includes a stack of media disks 550 for recording and retrieving data using recording heads disposed at the ends of actuator arms such as actuators 540A and 540B. HDD 500 includes two stacks of actuators, a first stack of actuators that includes actuator 540A, which are controlled by piezo motor stack 520A, and a second stack of actuators that includes actuator 540B, which are controlled by piezo motor stack 520B. As shown, the stacks of motors 520A and 520B are laterally staggered, that is provided in two adjacent stacks, to provide sufficient room. The configuration shown in FIGS. 5A and 5B allows for multiple active recording heads in each of two stacks, and therefore up to two active heads per recording surface for each recording surface, all individually controllable. Due to the compactness of the piezo motor design, such a two heads per surface configuration provides sufficient space for cabling and electronics on both sides of the system.

Figure 6:
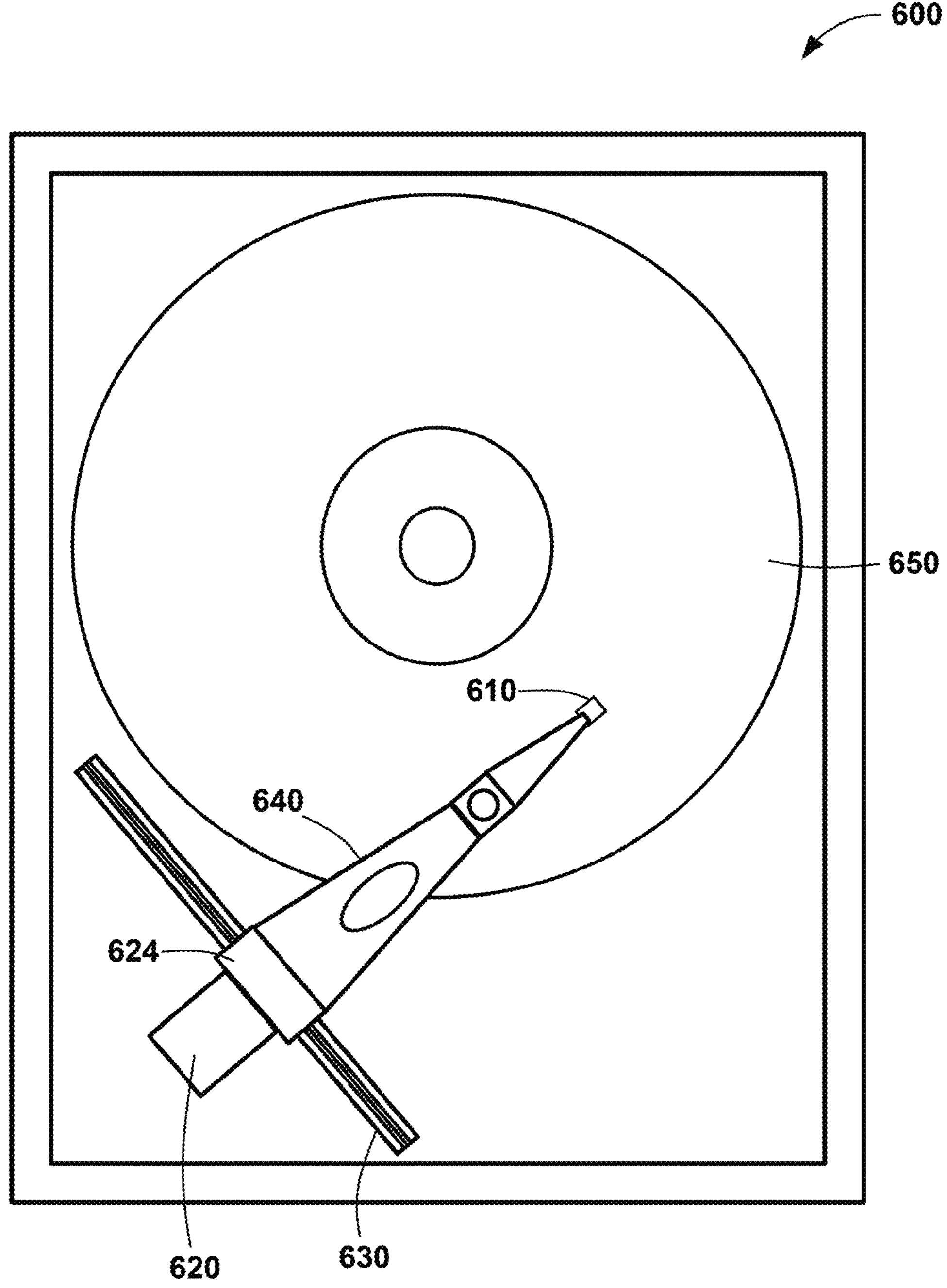
FIG. 6 is a schematic depiction of a hard drive device that includes a piezo motor for controlling linear motion of one or more actuators in accordance with aspects of the present disclosure.

FIG. 6 schematically shows a top view of certain components of an HDD 600 that employs linear actuation of the actuator arms. Actuator arm 640 traverses the magnetic media disk 650 by use of a linear rail system 630, stationary relative to the housing of HDD 600, thereby moving the recording head 610 in a linear fashion rather than in an arc such as with rotary actuation. Linear movement of the recording head may be useful in removing skew, thereby simplifying the servo system. A piezo motor such as motor 620 is coupled to an actuator hub 624 that is in turn coupled to the rail system 630. Piezo motor 620 can be any suitable piezo motor such as a USM, an inchworm motor, a slip-stick motor, and so forth. Multiple actuators may be stacked and joined to actuator hub 624 so that the entire stack of actuators moves in unison along the linear rail. Alternatively, multiple rail and piezo motor assemblies may be vertically stacked so that multiple actuators can be moved independently. Still further, an elevator-style system may be used to vertically move a single actuator arm to thereby access different recording surfaces, such as disclosed in U.S. Pat. No. 11,348,611. In addition to these embodiments, a second linear actuation system may be included on the other side of the disk 650 to provide for multiple recording heads per surface.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques). In addition, while certain aspects of this disclosure are described as being performed by a single module or unit for purposes of clarity, it should be understood that the techniques of this disclosure may be performed by a combination of units or modules.

All scientific and technical terms used herein have meanings commonly used in the art unless otherwise specified. The definitions provided herein are to facilitate understanding of certain terms used frequently herein and are not meant to limit the scope of the present disclosure.

As used herein, the term "configured to" may be used interchangeably with the terms "adapted to" or "structured to" unless the content of this disclosure clearly dictates otherwise.

As used herein, the term "or" refers to an inclusive definition, for example, to mean "and/or" unless its context of usage clearly dictates otherwise. The term "and/or" refers to one or all of the listed elements or a combination of at least two of the listed elements.

As used herein, the phrases "at least one of" and "one or more of" followed by a list of elements refers to one or more of any of the elements listed or any combination of one or more of the elements listed.

As used herein, the terms "coupled" or "connected" refer to at least two elements being attached to each other either directly or indirectly. An indirect coupling may include one or more other elements between the at least two elements being attached. Further, in one or more embodiments, one element "on" another element may be directly or indirectly on and may include intermediate components or layers therebetween. Either term may be modified by "operatively" and "operably," which may be used interchangeably, to describe that the coupling or connection is configured to allow the components to interact to carry out described or otherwise known functionality.

As used herein, any term related to position or orientation, such as "proximal," "distal," "end," "outer," "inner," and the like, refers to a relative position and does not limit the absolute orientation of an embodiment unless its context of usage clearly dictates otherwise.

The singular forms "a," "an," and "the" encompass embodiments having plural referents unless its context clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," and so forth, means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed is:

1. A hard disk drive for using recording heads to store data on rotating magnetic media disks, the hard disk drive comprising:

a stack of multiple actuator assemblies that are rotatably coupled to a stationary pivot, each actuator assembly configured to suspend an associated recording head over a surface of an associated rotating magnetic media disk, the stationary pivot being stationary relative to a housing of the hard disk drive and located a distance away from the rotating magnetic media disks; and a piezo motor configured to rotate the stack of actuator assemblies around the stationary pivot together as a single unit.

2. The hard disk drive of claim 1, wherein the piezo motor is an ultrasonic motor.

3. The hard disk drive of claim 1, wherein the piezo motor is an inchworm motor, brake crawler motor, stepper motor, or slip-stick motor.

4. The hard disk drive of claim 1, wherein the piezo motor engages a slider stage attached to the actuator assembly to thereby rotate the actuator assembly.

5. The hard disk drive of claim 1, further comprising a second actuator assembly configured to suspend a second recording head over the same surface of the rotating magnetic media disk, the second actuator assembly rotatably coupled to a second stationary pivot, and a second piezo motor configured to independently rotate the second actuator assembly around the second stationary pivot.

6. A hard disk drive for using recording heads to store data on rotating magnetic media disks, the hard disk drive comprising:

a stack of multiple actuator assemblies that are independently rotatable around a stationary pivot, each actuator assembly configured to suspend an associated recording head over a surface of an associated rotating magnetic media disk, the stationary pivot being stationary relative to a housing of the hard disk drive and located a distance away from the rotating magnetic media disks; and a piezo motor configured to rotate one of the actuator assemblies of the stack of actuator assemblies around the stationary pivot.

7. The hard disk drive of claim 6, wherein the piezo motor is one piezo motor of a stack of multiple piezo motors, each of the multiple piezo motors being configured to independently rotate a different one of the multiple actuator assemblies around the stationary pivot.

8. A hard disk drive for using a plurality of recording heads to store data on recording surfaces of a plurality of rotating magnetic media disks, the hard disk drive comprising:

a plurality of actuator assemblies, each of the actuator assemblies configured to suspend one or more of the plurality of recording heads over corresponding one or more recording surfaces of the plurality of rotating magnetic media disks, the plurality of actuator assemblies being independently rotatable around a single stationary pivot that is stationary relative to a housing of the hard disk drive; and a plurality of piezo motors, each of the plurality of piezo motors associated with a different one of the plurality of actuator assemblies and configured to rotate the associated actuator assembly around the stationary pivot, wherein the piezo motors are arranged into a first vertically aligned stack comprising a first portion of the piezo motors, the first vertically aligned stack positioned at a first location around the stationary pivot, and a second vertically aligned stack comprising a second portion of the piezo motors, the second vertically aligned stack positioned at a second location around the stationary pivot separated from the first location.

9. The hard disk drive of claim 8, wherein the first portion of the piezo motors is vertically staggered relative to the second portion of the piezo motors.

10. The hard disk drive of claim 8, wherein each of the plurality of piezo motors is an ultrasonic motor.

11. The hard disk drive of claim 8, wherein each of the plurality of piezo motors is an inchworm motor, brake crawler motor, stepper motor, or slip-stick motor.

* * * * *